3,061,410
ALUMINUM TITANIUM CHLORIDE COMPOSITION

William G. Toland, San Rafael, Calif., assignor to California Research Corporation, San Francisco, Calif., a corporation of Delaware
No Drawing. Filed Aug. 3, 1959, Ser. No. 831,024
1 Claim. (Cl. 23—87)

This invention relates to a new composition of matter useful as such either as a dehydrating agent in certain specialized uses or as a smoke screen producer, and as a component of catalytic compositions capable of catalyzing the polymerization of low molecular weight olefins to produce high molecular weight polymers.

This application is a continuation-in-part of my copending application Serial No. 631,021, filed December 28, 1956, and now abandoned, for "Aluminum Titanium Tetrachloride Composition."

The composition of the present invention is a solid consisting of aluminum, titanium, and chlorine, and containing these elements in proportions corresponding to the empirical formula $(AlTi_2Cl_8)_n$, where $n$ is at least unity. The composition may be prepared by reacting elemental aluminum and titanium tetrachloride at moderately elevated temperature, preferably in a hydrocarbon medium.

The following example will illustrate the preparation of the composition of the invention:

Example I

A 250 ml. stirred reactor was flushed with nitrogen to remove elemental oxygen. 100 ml. of mixed hexanes and stoichiometric amounts of titanium tetrachloride and aluminum required for $AlTi_2Cl_8$ were then introduced into the reactor. The stoichiometric amounts were 18.98 grams (0.1 mol) of titanium tetrachloride and 1.35 grams (0.05 gram atom) of aluminum powder. The reactor was then closed and twice flushed with nitrogen at 200 p.s.i.g. The nitrogen was then vented from the reactor to reduce the internal pressure to approximately atmospheric. The reactor was then sealed and heated to 120° C. The contents were held at this temperature and stirred for 16 hours. The reactor was then cooled and flushed with nitrogen. No elemental chlorine had been evolved during the reaction. The reactor was then transferred to a dry box which was flushed with nitrogen to remove air and water vapor. The reactor was then opened and its contents were filtered to separate a hydrocarbon filtrate and a solid filter cake. The filter cake was washed with mixed hexanes, dried in a nitrogen atmosphere, and bottled while still in the nitrogen atmosphere. 19.19 grams of a solid product were obtained.

The above solid product was determined to be $$(AlTi_2Cl_8)_n$$

where $n$ is at least unity, by subjecting the solid to a number of analyses, tests and observations, and by evaluating the findings, as follows:

(1) Type of solid—amorphous.
(2) Color—reddish purple.
(3) Content of unreacted aluminum—none.
(4) Content of unreacted titanium tetrachloride—none.
(5) Content of aluminum chloride as such—none, according to both X-ray diffraction studies and attempts to find activity which would be characteristic of aluminum chloride.
(6) Content of aluminum chloride as such, from azoxybenzene color test for aluminum chloride, Shriner and Fuson, "Identification of Organic Compounds" (2nd Edition, John Wiley & Sons, New York, 1940, page 34)—none; test negative.
(7) Content of titanium trichloride as such—none, both from X-ray diffraction studies and from the fact that the solid in water forms a pale grey-colored solution and results in no evolution of gas, whereas titanium trichloride in water forms a deep blue-colored solution and hydrolyzes, with the evolution of gas.
(8) Content of titanium dicholoride as such—none, both from X-ray diffraction studies and from the fact that placing the solid in water results in no evolution of gas, whereas titanium dichloride in water reacts with the water to form $TiOCl_2$ and hydrogen gas.
(9) X-ray diffraction studies:

(a) X-ray diffraction pattern—

| Line | 2θ | dA | I | Percent I/I max. |
|---|---|---|---|---|
| 1 | 15.0 | 5.901 | 8 | 80 |
| 2 | 17.2 | 5.151 | 6 | 60 |
| 3 | 19.7 | 4.503 | 3 | 30 |
| 4 | 22.5 | 3.948 | 1 | 10 |
| 5 | 26.4 | 3.373 | 1 | 10 |
| 6 | 30.7 | 2.910 | 6 | 60 |
| 7 | 33.1 | 2.704 | 2 | 20 |
| 8 | 35.8 | 2.506 | 10 | 100 |
| 9 | 38.7 | 2.325 | 1 | 10 |
| 10 | 42.7 | 2.116 | 2 | 20 |
| 11 | 46.6 | 1.947 | 2 | 20 |
| 12 | 51.7 | 1.767 | 7 | 70 |
| 13 | 54.2 | 1.691 | 4 | 40 |
| 14 | 60.9 | 1.520 | 3 | 30 |
| 15 | 64.0 | 1.4535 | 4 | 40 |
| 16 | 71.4 | 1.3200 | 1 | 10 |
| 17 | 75.7 | 1.2553 | 2 | 20 |
| 18 | 78.5 | 1.2174 | 1 | 10 |
| 19 | 86.3 | 1.1262 | 5 | 50 |

(b) Findings, from X-ray diffraction pattern: high surface area, no lines for aluminum chloride, titanium dichloride or titanium trichloride.

(10) Amount of potassium permanganate that reacts with the solid—2.22 milliequivalents. This was determined by reacting 0.2984 gram of the solid with excess 0.0995 N potassium permanganate with 0.1022 N sodium thiosulfate. Theoretical amount of potassium permanganate necessary to oxidize the titanium in $AlTi_2Cl_8$ to tetravalent titanium—2.21 milliequivalents.

(11) Solubility in mixed hexanes, cyclohexane, Decalin, white oil, carbon tetrachloride, p-dichlorobenzene, o-dichlorobenzene, chlorobenzene, titanium tetrachloride, antimony trichloride—none.
(12) Solubility in ether—slight.
(13) Solubility in water—rapid and complete decomposition of solid.
(14) Reaction with air and with water vapor—rapid, with evolution of volatile products.
(15) Melting point from heating—not determinable; decomposes both upon heating in the presence of air and upon heating in a vacuum.
(16) Molecular weight: Experimental data for weight percent of constituents is close to theoretical for $(AlTi_2Cl_8)_n$, where $n$ is unity, as follows:

|  | Experimental av. | Theory |
|---|---|---|
| Wt. percent Al | 7.54 | 6.64 |
| Wt. percent Ti | 23.8 | 23.57 |
| Wt. percent Cl | 67.5 | 69.79 |
| Totals | 98.84 | 100.00 |

(17) Ratio of aluminum content to titanium tetrachloride content—stoichiometric amounts necessary for $AlTi_2Cl_8$.

(18) Conclusion: The solid is $(AlTi_2Cl_8)_n$, where $n$ is at least unity.

The Example I preparation of the composition of the invention illustrates the preferred method. Any liquid hydrocarbon may be substituted for the hexanes; aliphatic, cycloaliphatic, and aromatic hydrocarbons being preferred. The preparation is preferably made at temperatures in the range 80° to 200° C., employing sufficient pressure to maintain the hydrocarbon in liquid phase. With a stoichiometric excess of $TiCl_4$ over aluminum, the $TiCl_4$ and aluminum combine in the stoichiometric amounts for $AlTi_2Cl_8$; evaporation of the unreacted $TiCl_4$ at the conclusion of the reaction leaves the same solid product obtained when the reaction is conducted using stoichiometric amounts in the first instance. It appears possible to make the preparation without the hydrocarbon diluent, but if this procedure is attempted, the temperature should be kept below about 150° C. There is, however, considerable advantage in using the hydrocarbon as described; its presence facilitates control of the reaction and recovery of the desired product.

When the solid prepared as in Example I and a strongly anionic agent, such as lithium aluminum hydride, trialkyl aluminums, lithium hydride, sodium hydride, trialkyl borons, boron hydrides, dialkyl magnesiums, sodium alkyls or sodium aluminum hydride, are dispersed in an inert, nonpolar liquid, the resulting mixture catalyzes the polymerization of many α-olefins, including propylene, to produce solid polymers. Also, a dispersion of the solid and a strongly cationic reagent such as titanium tetrachloride, titanium trichloride, aluminum chloride, boron trifluoride, dialkyl aluminum chloride, alkyl aluminum dichloride, vanadium trichloride, zirconium chloride, or silicon tetrachloride, in an inert nonpolar liquid will catalyze polymerization of ethylene to produce a solid polymer.

The employment of the composition of the invention as a component of a polymerization catalyst is illustrated in the following example, wherein propylene is polymerized.

*Example II*

A 360 milliliter rocking bomb was flushed with nitrogen to remove air and water vapor and charged with 100 ml. of mixed hexanes, 1.0 gram of an $AlTi_2Cl_8$ solid prepared as in Example I and 0.5 gram of $LiAlH_4$ powder. The bomb was closed and flushed three times with nitrogen at 200 p.s.i.g. Nitrogen was bled from the bomb to atmospheric pressure and 37 grams of Phillips 99% propylene was introduced. The bomb was sealed and heated with shaking for 1 hour. During the last half of this period, the temperature was in the range 71° to 87° C. and the pressure was in the range 180 to 130 p.s.i.g. The shaking was interrupted and an additional 15 grams of propylene was introduced into the bomb, which was then heated and shaken for 2½ hours. The temperature and pressure during this period were 92°–97° C. and 130–215 p.s.i.g. The shaking was interrupted and an additional 15 grams of propylene were introduced into the bomb, which was again heated with shaking for a further period of 1 hour, the temperature and pressure being maintained in the same range as during the preceding 2½ hour period. The bomb was then cooled to atmospheric temperature, vented to permit escape of unreacted propylene, and flushed with nitrogen. The contents of the bomb were immersed in 400 cc. of isopropyl alcohol and the resulting mixture was heated on a steam plate for 1 hour, during which the volume was reduced to 100 ml. 300 ml. of water and 100 ml. of 12 N hydrochloric acid were then added to the beaker, which was heated on a steam plate for 1 hour. At the end of this period the contents of the beaker were filtered and the filter cake was washed with water. The filter cake was then ground to a powder in a Waring Blendor and resuspended in 300 ml. of water, 100 ml. of 12 N hydrochloric acid and 100 ml. of 2-propanol. The suspension was heated for 1 hour and filtered. The filter cake was washed with water, with dilute ammonia, and again with water. The filter cake was then extracted with diethyl ether to remove amorphous polymer. After the extraction 28 grams of dry, solid crystalline polymer remained. The ether washings were diluted with methanol and water. The amorphous polymer contained in the ether separated out as a gummy mass which was separated, dried, and weighed. The weight of the amorphous polymer was 11.62 grams.

The solid crystalline polymer had a melting range of 160° to 163° C. It was pressed between thin glass discs at 180° C. to produce a film. The film was transparent-translucent and very tough. The intrinsic viscosity of the solid polymer was determined in tetralin at 155° C. and was found to be 2.76 dl./gram.

Solid polyethylene is produced when $AlTi_2Cl_8$ and certain Friedel-Crafts type catalysts are dispersed in mixed hexanes and the resulting mixture is contacted with ethylene under conditions similar to those employed in the above polymerization of propylene.

The solid prepared as in Example I is $(AlTi_2Cl_8)_n$, where $n$ is at least unity; there is of course no distinction chemically between $AlTi_2Cl_8$ and $(AlTi_2Cl_8)_n$, if the material does not exist in solution, as here. In such case the value of $n$, and therefore the molecular weight, is a function of the size of the solid crystal; the crystal in effect is all one molecule.

I claim:

As a new composition of matter, a reddish-purple amorphous-appearing solid compound in substantially pure form having the formula $(AlTi_2Cl_8)_n$, wherein $n$ is an integer, characterized by a rapid decomposition in water with no evolution of a gas, and an X-ray diffraction pattern possessing the following dominant $d$-spacings in angstroms: 5.9, 5.2, 2.9, 2.5, 1.77, and 1.13.

References Cited in the file of this patent

UNITED STATES PATENTS

| | | |
|---|---|---|
| 2,745,735 | Byrns | May 15, 1956 |
| 2,745,802 | Schmidt | May 15, 1956 |
| 2,765,270 | Brenner | Oct. 2, 1956 |
| 2,835,568 | Kingsbury | May 20, 1958 |
| 2,880,199 | Jezl | Mar. 31, 1959 |
| 2,928,818 | Carter et al. | Mar. 15, 1960 |